Patented Mar. 20, 1928.

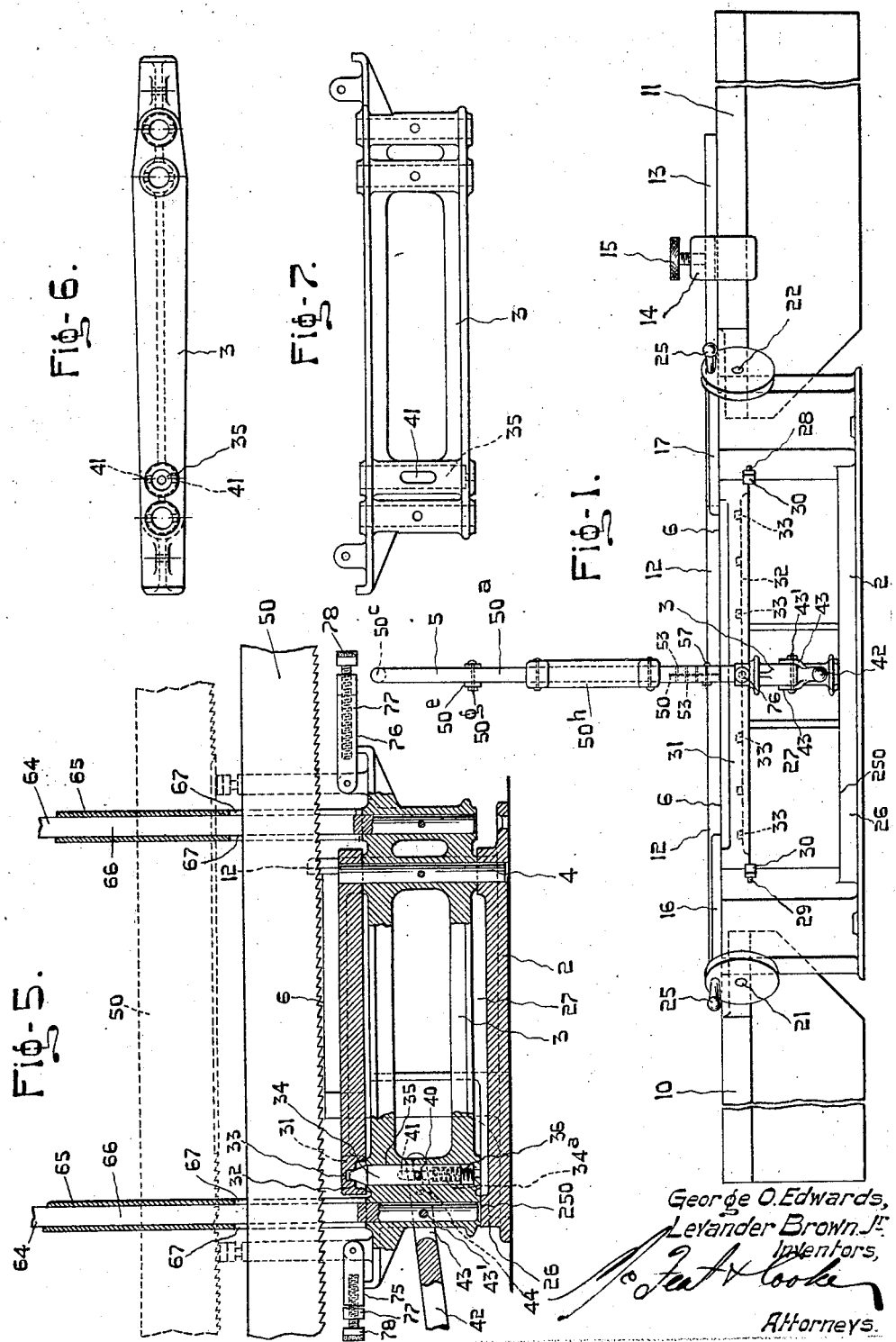

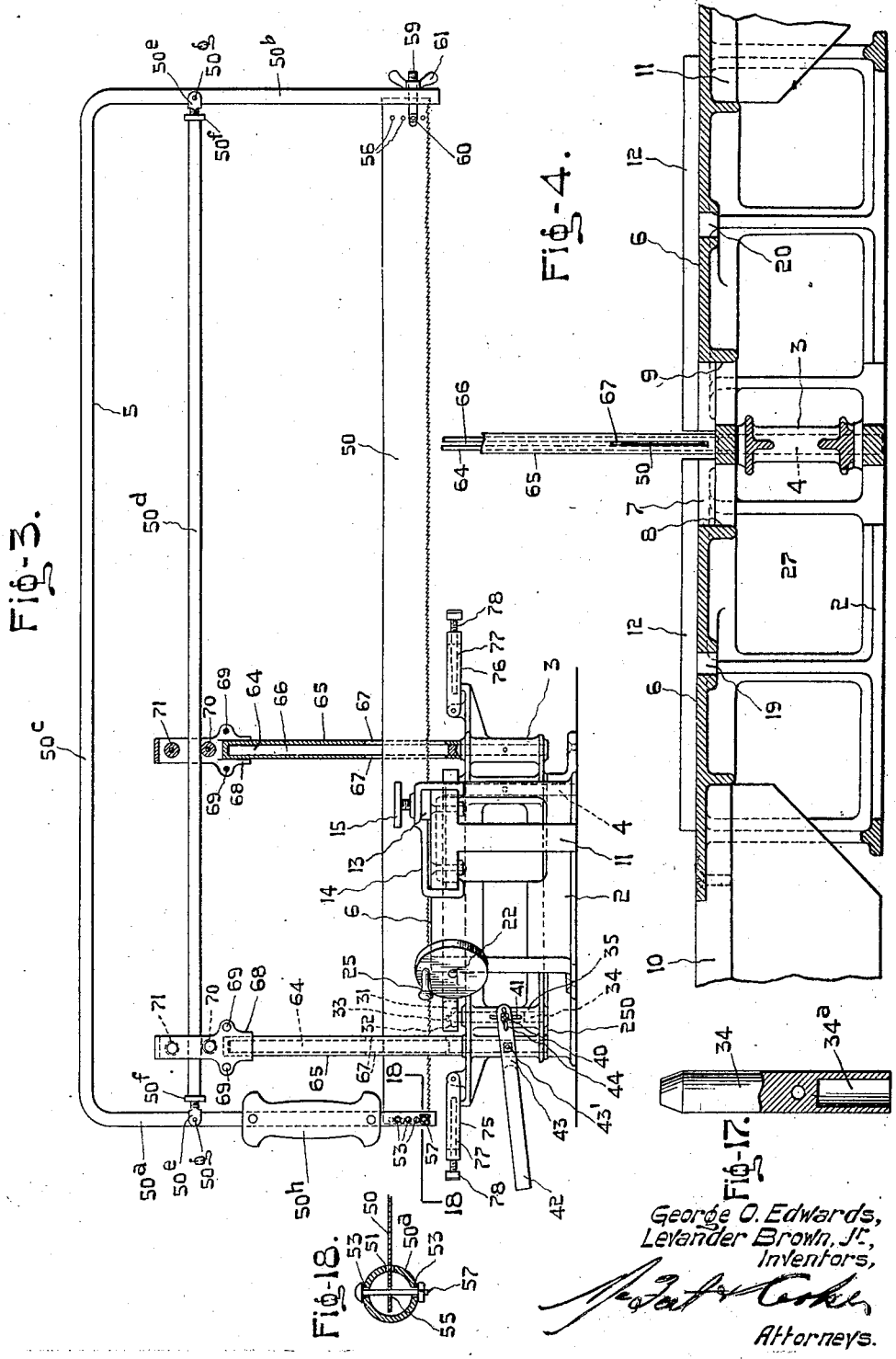

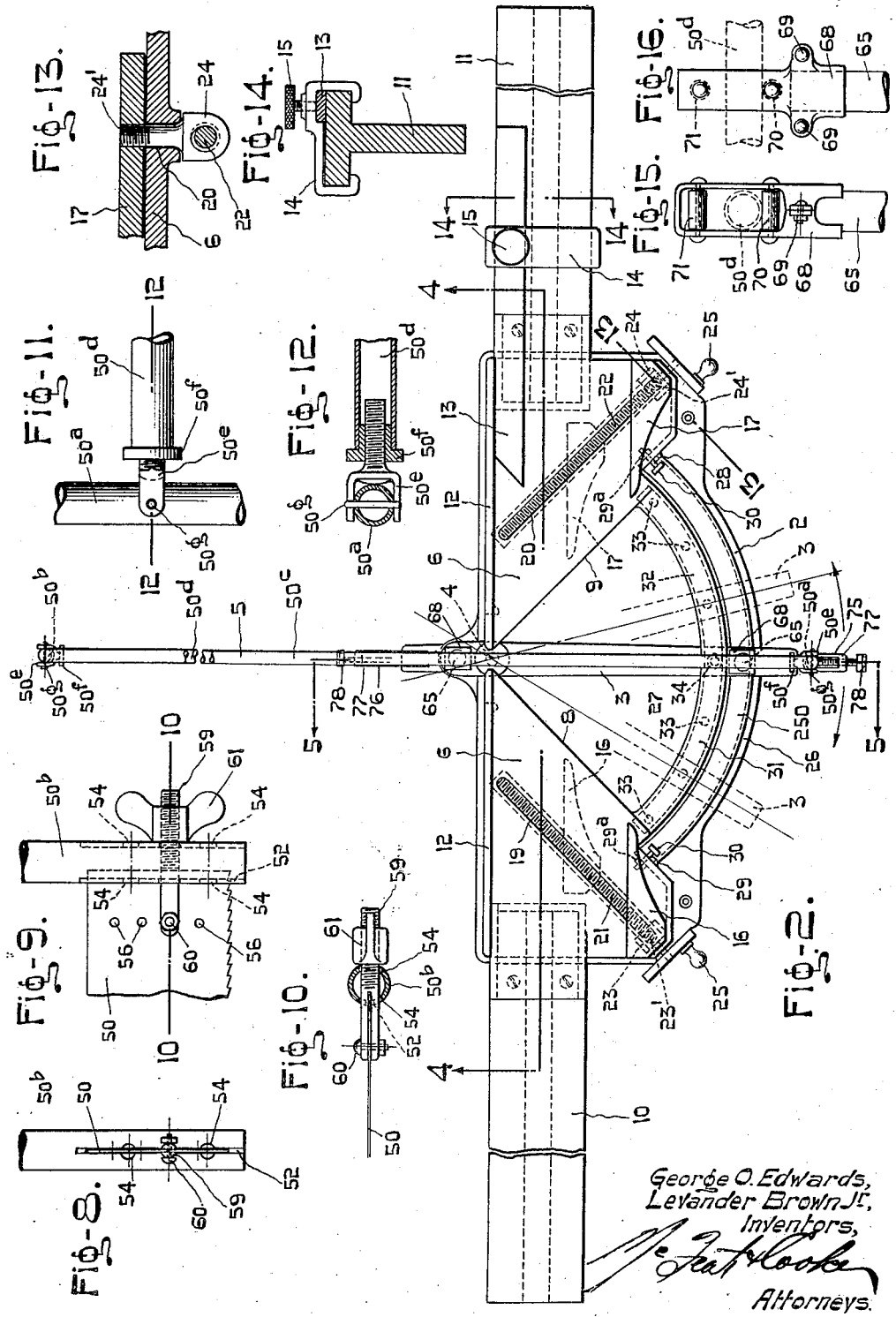

1,663,247

UNITED STATES PATENT OFFICE.

GEORGE OPIE EDWARDS AND LEVANDER BROWN, JR., OF MONTREAL, QUEBEC, CANADA.

MITERING MACHINE.

Application filed April 4, 1925. Serial No. 20,582.

The object of the present invention is to provide a mitering machine for use particularly by picture framers although adapted for general use in cabinet making and joinery with which more rapid and accurate work can be accomplished and with greater ease than has been possible with machines of this type heretofore in use.

A further object is to provide a machine having the foregoing characteristics, which is of simplified construction and which can be manufactured at a comparatively low cost.

To this end the invention consists of the combination, construction and particular arrangement of the parts hereinafter described and illustrated and pointed out in the claims.

For full comprehension however, of our invention, reference must be had to the accompanying drawings in which similar reference characters indicate the same parts, and wherein:

Figure 1 is a front elevation of a mitering machine constructed according to our invention;

Figure 2 is a plan view thereof;

Figure 3 is a side elevation thereof;

Figure 4 is a sectional view taken on line 4—4 Figure 2;

Figure 5 is a sectional view taken on line 5—5 Figure 2;

Figures 6 and 7 are detail views of the carriage casting;

Figures 8, 9 and 10 are detail views of the means for securing one end of the saw blade in the saw frame and for placing the blade under tension;

Figures 11 and 12 are detail views of the means for exerting tension on the blade independently of the means illustrated in Figures 8, 9 and 10;

Figure 13 is a detail view of one of the clamps and its actuating nut for securing an article to be sawn in position on the work support;

Figure 14 is a sectional view taken on line 14—14 Figure 2;

Figures 15 and 16 are detail views of the upper ends of the outer saw guides on the carriage;

Figure 17 is a detail view of the carriage holding pin; and

Figure 18 is a detail view of the means for adjustably fastening the end of the saw blade opposite to that illustrated in Figures 8, 9 and 10.

The machine illustrated in the accompanying drawings constitutes the preferred embodiment of our invention.

Briefly stated it consists of a saw table or work support 2, an adjustable carriage 3 rotatable on a vertical axis as at 4 upon the table, a bow saw 5 mounted upon the carriage and movable in unison therewith and relatively thereto, adjustable means for clamping the work in position upon the top of the table, adjustable measuring means for determining the length of the articles to be sawn, means for holding the carriage in the various positions to which it may be adjusted, and means for supporting the saw in positions raised above the cutting position.

The saw table or work support 2 consists of a unitary casting having a flat top 6 with a quadrantal opening 7 therein midway between its ends to accommodate the saw which in the present embodiment has a range of movement covering an arc of 90°, the angular sides 8 and 9 of the opening being disposed at an angle of 45° to the middle transverse vertical plane of the table so that it is possible to operate the saw at any angle up to 45° on each side of the transverse median line of the table. The area of the top or work supporting surface of the table may be varied to meet requirements, but for picture framing work and the like when it is necessary to support comparatively long pieces of moulding it is preferable to provide the table with extensions 10 and 11 of T-cross-section, the top surface of the latter coinciding with the top of the table.

The articles to be sawn are aligned upon the table against a back stop or abutment 12 constituted by a rib projecting upwardly above the top of the table and extending along the rear side thereof, and the length of each piece to be sawn is determined by an adjustable stop 13, the latter consisting of a flat metal strip which is clamped in the adjusted position by clamping member 14 embracing the top of the extension 11 and slidable thereon, and a set screw 15.

The adjustable means for securing the work upon the table in the position in which it is to be sawn consists of clamping members 16 and 17 located upon the table at opposite sides of the quadrantal opening and movable diagonally relatively to the abutment 12 in slots 19 and 20 disposed parallel to the angular sides of the opening. This movement is effected by feed-screws 21 and 22 rotatably mounted in the table beneath the top, nuts 23 and 24 movable axially on the feed-screws and connected to the members by studs 23¹ and 24¹ extending upwardly through the slots and formed integrally with the nuts, and handles 25 mounted upon the front ends of the feed-screws by which the latter may be manually rotated.

The saw carriage 3 by means of which the saw is adjusted to the angle at which it is desired to make the cut comprises a unitary casting pivoted adjacent its rear end upon a vertically disposed pin 4 mounted in fixed position within the table midway the length thereof at the apex of the quadrantal opening, the front end of the carriage being adapted to travel on a track 250 located at the front of the table and constituted by the base 26 thereof which is curved concentrically to the axis of the pin. The carriage has a range of movement covering an arc of 90° and the table is constructed to present a clear space 27 accommodating the movement. In order to provide adjustable means for stopping the carriage at the exact lines of the 45° angles abutments constituted by bolts 28 and 29 are mounted in the table at each end of the track and locked in their adjusted positions by nuts 29ᵃ, the heads of the bolts extending inwardly towards the carriage and presenting abutment faces 30.

The means for securing the carriage in any position to which it may be adjusted consists of a member 31 forming an integral part of the front of the table top and offset below the level thereof to provide clearance for the saw blade. It is curved concentrically to the axis of the carriage and is located directly over the front portion thereof and provided with a groove 32 in its underside in the bottom of which are a series of spaced sockets 33. These sockets are adapted to snugly receive the tapered upper end of a pin 34 slidably mounted in vertical position in a socket 35 in the carriage, the pin projecting above the top of the latter and having a tendency to enter the sockets imparted to it by a spiral spring 36 located within the socket 35 and bearing between the bottom thereof and the pin, the lower end of the latter being chambered as at 34ᵃ to receive the upper portion of the spring. The snug fit of the pin in the socket and the chambered lower end of the pin which tends to maintain the latter in its proper vertical alignment in the socket 35 reduce lateral "play" to a minimum and make it possible to obtain a precise adjustment.

In order to provide means for releasing the carriage when it is desired to change the angular position of the saw, studs 40 on opposite sides of the pin 34 are extended laterally through vertical slots 41 in the wall of socket 35 in the carriage and a releasing lever 42 having a forked end 43 is fulcrumed upon the carriage as at 43¹ in position with its fork straddling the front end of the latter and pivotally connected to the studs, the arms of the fork having slots 44 to receive the studs and permit of relative movement between the lever and pin.

The bow saw 5 comprises a unitary frame of inverted U-form and a saw blade 50 carried thereby. The frame consists of front and back vertical end members 50ᵃ and 50ᵇ respectively, preferably of tubular cross-section, united at their upper ends by a horizontal top member 50ᶜ also of tubular cross-section and formed integrally therewith, and a horizontal centre bar 50ᵈ extending between and having its ends connected to the end members and adapted to act as an adjustable strut therebetween for placing the saw blade under tension, the latter being stretched between and carried by the lower ends of the end frame members.

In order to effect adjustment of the intermediate strut member each end is connected to the end frame members by a threaded swivel pin 50ᵉ and a sleeve nut 50ᶠ, each swivel pin having a forked end straddling the adjacent end member and being pivotally connected thereto as at 50ᵍ, and its nut being inserted into the adjacent end of the tubular centre bar, and having a peripheral flange forming an abutment for the centre bar, so that by axial adjustment of each nut on its swivel pin the pressure on the end members may be varied to secure the desired tension on the saw blade. A handle 50ʰ is fitted directly around the front end member.

The saw blade consists of a thin steel member provided with fine teeth and having its ends so mounted in the end frame members that its cutting edge may be adjusted relatively to the saw table and to the saw frame. In addition to this adjustability the mount of the blade also permits of tension being exerted on the blade independently of the centre bar. The means for effecting these adjustments consists of slits 51 and 52 in the lower ends of the end frame member and adapted to receive the ends of the saw blade; a series of transverse bolt holes in the slotted end of each end frame member and indicated respectively at 53 and 54; a series of bolt holes in each end of the saw blade indicated at 55 and 56 respectively; a transverse bolt 57 passed through one of the holes in each of the series 53 and 55 and adapted to secure the adjacent end of the saw blade in the front end member, and a tension bolt 59 passed through one of the holes of the series 54 in the rear end member, and having its inner end split to receive the adjacent end of the saw blade and being connected thereto by a bolt 60 passed through one of the bolt-holes of the series 56, the outer end of the tension bolt protruding beyond the frame and being threaded to receive a tightening nut 61. The series of bolt holes in each end frame member are so spaced relatively to the series of holes in the saw blade that slight vertical adjustment of the blade within the frame brings one or more of the holes in the blade into alignment with the holes in the frame, so that when it is desired to adjust the blade in the frame the securing bolts are first removed, the blade shifted to the desired position, and the bolts replaced.

This construction and arrangement of parts provides a combined means for securing the blade in the frame, for placing it under tension, and for adjusting the blade relatively to its carrying frame and consequently the saw table.

Additional and independent adjustment of the saw relatively to the saw table is also provided by the means for mounting the saw upon the carriage, and for guiding it in its movement relatively to the saw table. This last mentioned means consists of a pair of spaced vertical inner guides 64 of solid cross-section although not essentially so, located one at each end of the carriage and projecting upwardly therefrom, and a second pair of guides 65 encircling the first-mentioned pair and in telescopic relation therewith, the guides of both pairs having vertical slots 66 and 67 respectively to receive the saw blade, the slots 66 in the inner guides being slightly wider than the slots 67 in the outer guides. The upper ends of the outer sleeve guides terminate in collars 68 which loosely encircle the longitudinal centre bar 50ᵈ of the saw frame. These collars are adjustably clamped on the ends of the guides as at 69 and having vertically spaced anti-friction rollers 70 and 71 rotatably mounted therein, the rollers being located above and below the centre bar 50ᵈ and spaced a sufficient distance apart to enable either end of the saw to be canted upwardly or raised to position clear of the work upon the table.

The saw may be supported in either position by rests 75 and 76 mounted upon front and rear ends of the carriage, each rest consisting of two relatively adjustable parts 77 and 78 one consisting of an internally threaded member which is hinged upon the carriage in position directly beneath the saw blade and the other consisting of an adjustable extension in the form of a bolt which is screwed into the member, the bolt having a head of a comparatively soft material for engagement with the saw blade.

The foregoing construction and arrangement of parts provides a mitering machine with which work of great precision can be accomplished both with rapidity and ease, the construction permitting the use of a thinner and narrower saw blade than has been heretofore employed in machines of this type, and consequently making it possible to obtain a perfect mitre joint without necessitating the planing of the mitered ends. The joint thus obtained is consequently very strong because the slightly roughened meeting surfaces of the joined ends interlock with each other and provide ideal holding surfaces for the glue.

*Operation.*

When it is desired to saw a length of picture molding say at an angle of 45°, the molding is placed upon the table in position beneath the saw and aligned against the back stop or abutment 12 with the right hand end of the molding in bearing relationship with the measuring stop 13 which has been previously adjusted. The molding is then clamped in this position by rotating the handles 25 in a direction in which the clamping members 16 and 17 will be fed into engagement with the molding. The carriage is then released if not in the 45° position and swung thereto following which the saw may be lowered to its cutting position and operated in the usual manner.

What we claim is as follows:—

1. A mitering machine consisting of a work support, a carriage adjustably mounted upon the work support, a pair of posts rigidly mounted upon the carriage and located one at each end thereof and projecting upwardly therefrom, said posts being slotted from their upper ends downwardly to within close proximity of the carriage and the upper ends of the slots being open to allow the saw to be lifted off at will, and a saw unit consisting of a frame having a horizontal member, a blade mounted in the frame in parallelism with the member, and sleeve guides suspended from the said member and having slots through which said blade passes, said unit being adapted to be mounted upon the carriage with the sleeve guides enclosing the posts and with the saw blade passing through the slots therein the unit being instantly removable from the carriage as a whole.

2. A mitering machine consisting of a work support, a carriage adjustably mounted upon the work support, a saw blade and means for mounting the blade upon the carriage, said means consisting of a pair of vertical posts rigidly mounted upon the carriage and located one at each end thereof and projecting upwardly therefrom, said posts being slotted downwardly from their upper ends to receive the said saw blade, the upper ends of the slots being open to allow the saw to be lifted off at will, and a guide sleeve encasing each post and in telescopic relation therewith, said sleeves having slots aligned with the slots in the posts.

3. In a mitering machine a work support; a carriage rotatably mounted upon the work support, a saw mounted upon the carriage and rotatable in unison therewith and capable of being raised and lowered upon the carriage, and adjustable means for supporting the saw in its raised position, said last-mentioned means consisting of a rest hinged upon the carriage in vertical alignment with the saw blade and adapted to assume horizontal and vertical positions.

4. A saw carriage consisting of an integral casting and having pivotal means for being rotated horizontally on a work support, and adapted to have its travelling end supported by a track; sockets for vertically holding saw guides; a socket, and slots for accommodating and guiding a vertically movable pin for holding the carriage immovable on the work support; means for attaching a lever to operate the holding pin, and means for attaching a support for holding the saw in a raised position.

5. In a mitering machine the combination with a carriage for carrying a saw, such carriage being movable in a curved path concentric to a central point and adjustable from one angular position to another, of a track below the carriage and concentric to the path of the carriage, a member above the carriage, means pivoting the carriage and rigidly uniting the member to the track, and means whereby the carriage is rigidly held by expansive force between the top member and track.

6. In a mitering machine the combination with a radial saw carriage movable in a curved path from one angular cutting position to another, of a work support having a rigid horizontal track for supporting the carriage from beneath such track being curved concentrically to the path travelled by the saw and its carriage while being moved from one angular position to another, and a member above the carriage and rigidly secured to the track, and an expansive spring pin carried by the carriage and exerting pressure on the upper member and forcing the carriage down onto the track.

7. In a mitering machine a carriage, a bracing member above the carriage, a track upon which the carriage travels, means securing the bracing member and track in rigid relation, a relatively long vertical pin carried within a relatively long socket in the carriage, such socket having an open top, a relatively long expansible helical spring within the pin and bearing at its lower end on the carriage for causing the pin to engage anyone of a series of sockets in the bracing member, and means for withdrawing the pin from the socket.

8. In a mitering machine the combination with a table, a fixed means for determining the depth of the cut with relation to the table, a saw frame, a blade, the saw blade having at each end a vertical series of horizontal holes and the respective frame members having series of holes differently spaced from the spacing between the holes in the ends of the saw blade and means for securing the blade through the registering holes of the respective related series, immovably in the slots.

In testimony whereof we have signed our names to this specification.

GEORGE O. EDWARDS.
LEVANDER BROWN, Jr.